(12) United States Patent
Hu et al.

(10) Patent No.: US 9,983,623 B2
(45) Date of Patent: May 29, 2018

(54) TOUCH SENSING DEVICE AND TOUCH CONTROL SYSTEM

(71) Applicant: Touchplus Information Corp., New Taipei (TW)

(72) Inventors: Shih-Hsien Hu, New Taipei (TW); Yi-Feng Wei, New Taipei (TW); Yao-Chih Chuang, Tainan (TW)

(73) Assignee: TOUCHPLUS INFORMATION CORP., New Taipei (TW)

( * ) Notice: Subject to any disclaimer, the term of this patent is extended or adjusted under 35 U.S.C. 154(b) by 301 days.

(21) Appl. No.: 14/741,556

(22) Filed: Jun. 17, 2015

(65) Prior Publication Data
US 2015/0363027 A1    Dec. 17, 2015

Related U.S. Application Data

(60) Provisional application No. 62/013,048, filed on Jun. 17, 2014.

(30) Foreign Application Priority Data

Nov. 21, 2014 (CN) .......................... 2014 1 0670593

(51) Int. Cl.
| G06F 3/044 | (2006.01) |
| G06F 1/16 | (2006.01) |
| G06F 3/0488 | (2013.01) |
| G06F 3/0354 | (2013.01) |

(52) U.S. Cl.
CPC .......... *G06F 1/163* (2013.01); *G06F 3/03547* (2013.01); *G06F 3/044* (2013.01); *G06F 3/04883* (2013.01); *G06F 2203/0339* (2013.01); *G06F 2203/04101* (2013.01); *G06F 2203/04102* (2013.01)

(58) Field of Classification Search
CPC ...... G06F 1/163; G06F 3/044; G06F 3/03547; G06F 3/04883; G06F 2203/0339; G06F 2203/04102; G06F 2203/04101
See application file for complete search history.

(56) References Cited

U.S. PATENT DOCUMENTS

| 2012/0032916 A1* | 2/2012 | Enoki | G06F 3/044 |
| | | | 345/174 |
| 2012/0046106 A1* | 2/2012 | Ito | A63F 13/42 |
| | | | 463/37 |
| 2013/0063367 A1* | 3/2013 | Jang | G06F 3/011 |
| | | | 345/173 |
| 2013/0099805 A1* | 4/2013 | Reynolds | G06F 3/0202 |
| | | | 324/686 |
| 2013/0314376 A1* | 11/2013 | Chang | G06F 3/0418 |
| | | | 345/174 |
| 2014/0035865 A1 | 2/2014 | Hu | |

(Continued)

*Primary Examiner* — Premal R Patel
(74) *Attorney, Agent, or Firm* — WPAT, PC

(57) ABSTRACT

A touch sensing device and a touch control system are provided. The touch sensing device includes a substrate, three conductive sensor pad units and a processing unit. The three conductive sensor pad units sense a touch operation and generate three corresponding sensing signals in response to the touch operation. The processing unit determines values of at least three variables according to the three sensing signals. The controlled device of the touch control system is controlled according to the values of the variables.

13 Claims, 7 Drawing Sheets

(56) References Cited

U.S. PATENT DOCUMENTS

| | | |
|---|---|---|
| 2014/0097857 A1 | 4/2014 | Hu |
| 2014/0097885 A1 | 4/2014 | Hu |
| 2015/0018101 A1* | 1/2015 | Schoenith ............... A63F 13/98 463/37 |
| 2016/0253064 A1* | 9/2016 | Hattori ................ H04M 1/0281 715/716 |

* cited by examiner

TOUCH SENSING DEVICE AND TOUCH CONTROL SYSTEM

CROSS-REFERENCE TO RELATED APPLICATIONS

The present application is a nonprovisional application claiming benefit from a prior-filed provisional application bearing a Ser. No. 62/013,048 and filed Jun. 17, 2014, the entity of which is incorporated herein for reference.

FIELD OF THE INVENTION

The present disclosure relates to a touch sensing device and a touch control system, and particularly to a multivariable touch sensing device and a multivariable touch control system.

BACKGROUND OF THE INVENTION

With rapid development of touch sensing technology, touch control systems have become part of everyday life. Many electronic consumer products, including TVs, refrigerators, remote controllers, portable electronic devices and the like, are usually equipped with various types of touch control units to provide easy human-machine interface to enhance intuitive operation. However, the control function is quite limited since only tapping operation or sliding operation is used and few variables are obtained during one touch operation. For example, X-coordinate and Y-coordinate of a touch object in an X-Y coordinate system are viewed as two variables. When the touch object moves, the two variables change and they are detected or calculated respectively and continuously. For another example, the two variables may indicate that the touch object is present or absent so as to determine whether a tapping operation on a virtual button of the touch control unit is performed.

Due to the limited and inconvenient operation mode, there is still a significant gap for intuitive operation. How to obtain as much information as possible during a short touch operation period is an important issue now.

SUMMARY OF THE INVENTION

The present disclosure provides a touch sensing device and a touch control system using the touch sensing device. The touch sensing device can determine values of at least three variables in one touch operation.

An aspect of the present disclosure provides a touch sensing device. The touch sensing device includes a substrate, a first conductive sensor pad unit, a second conductive sensor pad unit, a third conductive sensor pad unit and a processing unit. The substrate has a first surface and a second surface opposite to the first surface. The first conductive sensor pad unit is disposed on the second surface or positioned near the second surface, and configured to sense a touch operation relative to the first surface and generate a first sensing signal in response to the touch operation. The second conductive sensor pad unit is disposed on the second surface or positioned near the second surface, and configured to sense the touch operation relative to the first surface and generate a second sensing signal in response to the touch operation. The third conductive sensor pad unit is disposed on the second surface or positioned near the second surface, and configured to sense the touch operation relative to the first surface and generate a third sensing signal in response to the touch operation. The processing unit is in communication with the first conductive sensor pad unit, the second conductive sensor pad unit and the third conductive sensor pad unit. The processing unit receives the first sensing signal, the second sensing signal and the third sensing signal, and determines values of at least a first variable, a second variable and a third variable according to the first sensing signal, the second sensing signal and the third sensing signal.

In an embodiment, the processing unit determines the value of the first variable according to a difference between the first sensing signal and the second sensing signal, determines the value of the second variable according to a difference between the first sensing signal and the third sensing signal, and determines the value of the third variable according to a difference between the second sensing signal and the third sensing signal.

In an embodiment, the processing unit determines a value of a fourth variable regarding z-axis information of the touch operation according to a sum of the first sensing signal, the second sensing signal and the third sensing signal.

In an embodiment, the processing unit determines the value of the first variable according to a difference between a change of the first sensing signal and a change of the second sensing signal at two time points, determines the value of the second variable according to a difference between the change of the first sensing signal and a change of the third sensing signal at the two time points, and determines the value of the third variable according to a difference between the change of the second sensing signal and the change of the third sensing signal at the two time points.

Another aspect of the present disclosure provides a touch control system. The touch control system includes the touch sensing device as described above and a controlled device. The controlled device is in communication with the processing unit. The controlled device receives the values of the first variable, the second variable and the third variable from the processing unit. The controlled device is controlled according to the values of the first variable, the second variable and the third variable.

In an embodiment, a slot is provided on the first surface for holding the controlled device.

A further aspect of the present disclosure provides a touch sensing device. The touch sensing device includes a casing and an internal circuit. The casing has an outer surface wherein a slot is provided on the outer surface for holding a portable device. The internal circuit disposed in a space in the casing or embedded in the casing. The internal circuit is in communication with the portable device held on the slot. The internal circuit generates a control signal to control the portable device in response to a touch operation relative to the outer surface of the casing.

In an embodiment, the internal circuit includes at least one conductive sensor pad unit, a processing unit, a state sensor and an integrated functional circuit. The conductive sensor pad unit senses the touch operation relative to the outer surface of the casing and generates a sensing signal. The processing unit is in communication with the conductive sensor pad unit, and configured to receive the sensing signal and determine a value of a variable according to a change of the sensing signal. The state sensor is in communication with the processing unit, and configured to determine the control signal according to the value of the variable and a state of the touch sensing device. The integrated functional circuit is in communication with the state sensor. The integrated functional circuit operates in response to the control signal In an embodiment, the state sensor includes a gesture sensor and an attitude sensor. The gesture sensor determines the control signal according to the value of the variable from the processing unit. The attitude sensor senses the state of the touch sensing device and determines the control signal according to the state of the touch sensing device.

In an embodiment, the attitude sensor is a g-sensor or a gyroscope.

In an embodiment, the integrated functional circuit controls an output volume in a first volume range when the touch sensing device is in a first state. The integrated functional circuit controls the output volume in a second volume range when the touch sensing device is in a second state. The second volume range covers a lower portion of the first volume range.

BRIEF DESCRIPTION OF THE DRAWINGS

The advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
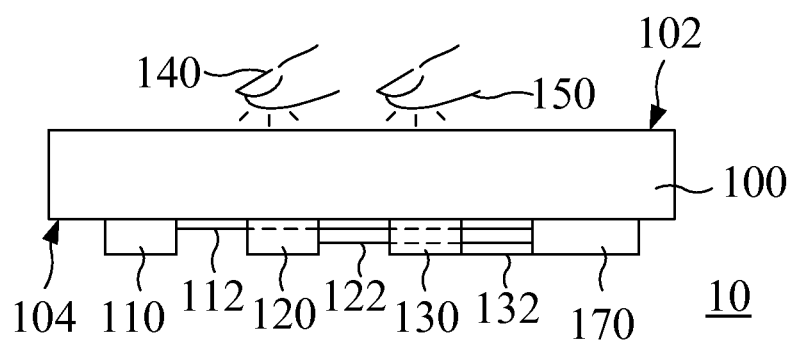
FIG. 1A and FIG. 1B are a side view and a top view illustrating a touch sensing device according to an embodiment of the present invention.

Please refer to FIG. 1A, a side view and a top view illustrating a touch sensing device according to an embodiment of the present invention. The touch sensing device 10 includes a substrate 100, a first conductive sensor pad unit 110, a second conducive sensor pad unit 120, a third conductive sensor pad unit 130 and a processing unit 170. The substrate 100 has a first surface 102 and a second 104 opposite to the first surface 102. The first conductive sensor pad unit 110, the second conducive sensor pad unit 120, the third conductive sensor pad unit 130 and the processing unit 170 are disposed on the second surface 104 of the substrate 100. The first conductive sensor pad unit 110, the second conducive sensor pad unit 120 and the third conductive sensor pad unit 130 are in communication with the processing unit 170 via signal paths 112, 122 and 132, respectively.

Although the signal paths 112, 122 and 132 are illustrated as traces, the signal paths are not limited to real traces, wires or buses. For example, the signal paths 112, 122 and 132 may be wireless transmission paths. For transmission of wireless signals, the first conductive sensor pad unit 110, the second conducive sensor pad unit 120, the third conductive sensor pad unit 130 and the processing unit 170 should have wireless transmission transmitter/receiver modules.

It is not necessary to dispose the first conductive sensor pad unit 110, the second conducive sensor pad unit 120, the third conductive sensor pad unit 130 and the processing unit 170 on the second surface 104 of the substrate 100. If the touch sensing device 10 is designed to receive touch operation of touch objects 140 and 150 relative to the first surface 102, the first conductive sensor pad unit 110, the second conducive sensor pad unit 120, the third conductive sensor pad unit 130 and the processing unit 170 may be disposed on the second surface 104, embedded within the substrate 100 or positioned near the second surface 104 without actual contact with the substrate 100. For example, if the touch sensing device 10 is designed for a specific electronic device, e.g. a portable computer, the first conductive sensor pad unit 110, the second conductive sensor pad unit 120, the third conductive sensor pad unit 130 and the processing unit 170 are formed on a circuit board (now shown). The circuit board is then mounted on, fixed to or disposed near the second surface 104 of the substrate 100 of the portable computer.

The term "touch operation" in the specification may refer to a real touch operation/gesture actually acting on the touch surface or a floating touch operation/gesture over the touch surface. The floating touch operation involves a vertically moving action (movement in z-axis, a normal to the touch surface), a horizontally moving action (movement parallel to the touch surface) or a holding-still action for a specified period.

Although the first conductive sensor pad unit 110 is illustrated as a single pad, the first conductive sensor pad unit 110 is implemented by at least one conductive sensor pad in practice. Similarly, each of the second conductive sensor pad unit 120 and the third conductive sensor pad unit 130 is implemented by at least one conductive sensor pad. In an embodiment, each of the conductive sensor pad units 110, 120 and 130 is implemented by several conductive sensor pads. In another embodiment, at least one of the conductive sensor pad units 110, 120 and 130 is implemented by several conductive sensor pads, while the other is implemented by a single conductive sensor pad. In a further embodiment, at least three of a plurality of conductive sensor pads are selected to serve as the conductive sensor pad units 110, 120 and 130, and unselected conductive sensor pads are used for idle or other purposes. Thus, the touch sensing device 10 can be formed with other functional units to simplify the manufacturing process. Corresponding to the conductive sensor pad units 110, 120 and 130, each of the signal paths 111, 122 and 132 may represent more than one signal path for signal transmission, e.g. bus, signal line or wireless signal used in serial/parallel communication.

Figure 1B:
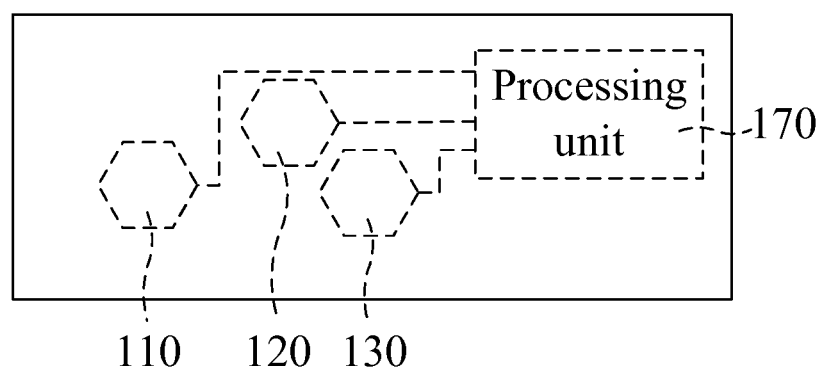

There is no specific requirement of relative positions of the first conductive sensor pad unit 110, the second conductive sensor pad unit 120 and the third conductive sensor pad unit 130. Please refer to FIG. 1B, a top view of the touch sensing device 10 of FIG. 1A. The relative positions of the units 110, 120, 130 and 170 are for illustrative purposes only. The real layout may be arranged according to various factors, circuit functionalities, layout difficulties or impedance matching.

Please refer back to FIG. 1A. The touch sensing device 10 is operated with a single touch object 140 or 150 or operated simultaneously with several touch objects 140 and 150. For example, when the touch objects 140 and 150 approach or touch the first surface 102 of the substrate 100, the first conductive sensor pad unit 110, the second conductive sensor pad unit 120 and the third conductive sensor pad unit 130 issue corresponding sensing signals in response to the approaching or touching of the touch objects 140 and 150. Concretely, the touch operation involving the approaching or touching action affects physical properties of the first conductive sensor pad unit 110, e.g. capacitance, pressure, illuminance or deformation. Then, the first conductive sensor pad unit 110 generates a first sensing signal in response to the change of the physical properties of the first conductive sensor pad unit 110. Similarly, the second conductive sensor pad unit 120 and the third conductive sensor pad unit 130 issue a second sensing signal and a third sensing signal in response to the change of the physical properties thereof resulting from the touch operation of the touch objects 140 and 150.

Then, the first sensing signal, the second sensing signal and the third sensing signal are transmitted to the processing unit 170 via the signal paths 112, 122 and 132, respectively. The processing unit 170 determines values of at least three variables according to the first sensing signal, the second sensing signal and the third sensing signal. In an embodiment, the value of a first variable is determined according to a difference between the first sensing signal and the second sensing signal at the same time point; the value of a second variable is determined according to a difference between the first sensing signal and the third sensing signal at the same time point; and the value of a third variable is determined according to a difference between the second sensing signal and the third sensing signal at the same time point. In another embodiment, the values of the three variables are determined according to a sum of any two sensing signals. In a further embodiment, the values of the variables are determined according to the change of the sensing signals during a specified time period. In a further embodiment, the value of the first variable is determined according to a difference between a change of the first sensing signal and a change of the second sensing signal at two time points; the value of the second variable is determined according to a difference between the change of the first sensing signal and a change of the third sensing signal at the two time points; and the value of the third variable is determined according to a difference between the change of the second sensing signal and the change of the third sensing signal at the two time points. All in all, according to the sensing signals, the gesture of the user fingers (touch object) or the configuration/position change (e.g. movement) of the touch object(s) 140 or 150 is determined and a control signal with at least three variables is generated.

Furthermore, a value of a fourth variable regarding z-axis information of the touch operation is determined according to a sum of the three sensing signals. Alternatively, the value of the fourth variable is directly obtained by the touch operation. In an instance, the conductive touch pad units can sense the floating touch operation based on capacitance or illuminance change. The distance between the substrate 100 and the touch object(s) 140 or 150 may be used to determine the value of the fourth variable. In another instance, the conductive touch pad units can sense the real touch operation based on pressure change or deformation. The pressure exerted on the substrate 100 may be used to determine the value of the fourth variable. In addition to these embodiments, there is still other operation mode which can increase the number of the variables for controlling the touch sensing device 100 so that the operation modes can be enhanced.

Figure 2A:
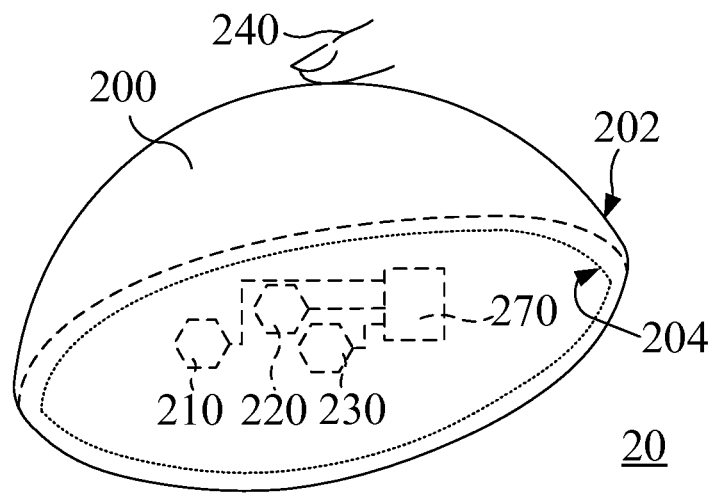
FIG. 2A is a perspective view illustrating a touch sensing device according to another embodiment of the present invention.

Please refer to FIG. 2A, a perspective view illustrating a touch sensing device according to another embodiment of the present invention. It is shown that the touch sensing device 20 has a curved substrate 200. The first surface 202 is a convex surface and the second surface 204 is a concave surface. The shape of the touch sensing device 20 makes the touch sensing device 20 easy to grasp. For this case, a touch object 240 such as user finger performs touch operation relative to the first surface 202 of the substrate 200. The first conductive sensor pad unit 210, the second conductive sensor pad unit 220, the third conductive sensor pad unit 230 and the processing unit 270 are embedded in the second surface 204 of the substrate 200 or disposed within a space surrounded by the curved substrate 200. Since the conductive sensor pads 210, 220 and 230 of the present disclosure supports floating touch sensing, the touch operation relative to the convex surface 240 can still successfully actuate the related touch control function.

Figure 2B:
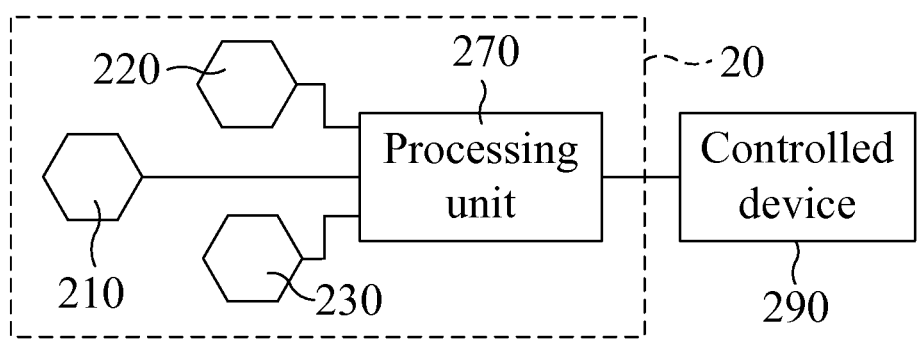
FIG. 2B is a circuit block diagram of a touch control system using the touch sensing device of FIG. 2A.

The touch sensing device 20 of FIG. 2A is used in a touch control system for controlling various controlled devices. Please refer to FIG. 2B, a circuit block diagram of a touch control system using the touch sensing device. As shown in FIG. 2B, the touch control system 2 makes use of the touch sensing device 20 to control the controlled device 290. The controlled device 290 may be disposed in the touch sensing device 20 or separate from the touch sensing device 20. The controlled device 290 is in communication with the processing unit 270 for receiving the first variable, the second variable and the third variable and performing specified function according to the first variable, the second variable and the third variable.

Different controlled devices 290 may perform different functions according to the same combination of the first variable, the second variable and the third variable. For example, if the controlled device 290 is a multi-color lamp, the first variable, the second variable and the third variable represent RGB values, and the fourth variable represents the luminous intensity. Therefore, the light color is controlled by positions of touch points on the touch sensing device 20, and the luminous intensity is controlled by the distance between the finger and the first surface 202 of the substrate 200 of the touch sensing device 20 or the pressure exerted on the first surface 202 of the substrate 200.

The applications of the controlled device 290 include electronic robotic toy, gesture sensor, speaker, radio, clock, timer, mouse, projection keyboard, global positioning system (GPS), etc. The controlled device 290 and the touch sensing device 20 compose the touch control system 2. For example, the touch control system 2 is a smart phone, and the substrate 200 of the touch sensing device 20 forms a back cover of the smart phone. Thus, the user can use the smart phone by touch operation relative to the first surface 202 of the substrate 200. In an embodiment, the conductive sensor pad units 210, 220 and 230 are mounted on or embedded in the second surface 204 of the substrate 200. A pogo pin connector may be used to communicate the conductive sensor pad units 210, 220 and 230 with the processing unit 270 disposed on a circuit board of the smart phone. In another embodiment, the processing unit 270 is formed with the conductive sensor pad units 210, 220 and 230 and in communication with a control center of the smart phone by means of a pogo pin connector. In a further embodiment, the processing unit 270 and the conductive sensor pad units 210, 220 and 230 are disposed on the circuit board of the smart phone. In this condition, the conductive sensor pad units 210, 220 and 230 should support floating touch sensing to sense the touch operation with or without touching the first surface 202 of the substrate 200.

Figure 3:
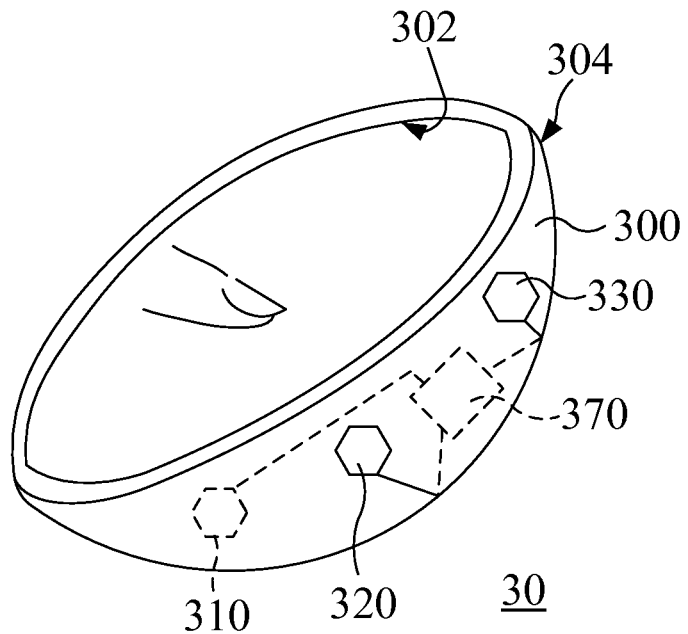
FIG. 3 is a perspective view illustrating a touch sensing device according to a further embodiment of the present invention.

Please refer to FIG. 3, a perspective view illustrating a touch sensing device according to a further embodiment of the present invention. In this embodiment, the substrate 300 of the touch sensing device 30 is curved in an opposite direction to the embodiment with reference to FIG. 2A. The first surface 302 of the substrate 300 is a concave surface and the second surface 304 of the substrate 300 is a convex surface. Since the first conductive sensor pad unit 310, the second conductive sensor pad unit 320, the third conductive sensor pad unit 330 and the processing unit 370 are not covered and protected by the substrate 300, a transparent or an opaque protection layer wrapping the second surface 304 together with the electronic elements thereon is optionally provided.

Similarly, the touch sensing device 30 is used in a touch control system for controlling various controlled devices. The circuit block diagram of FIG. 2B is also applicable to the touch sensing device 30 and detailed description is not given again. For example, if the controlled device is a sprinkler head, the first variable, the second variable and the third variable represent spray direction, spray time and spray strength, and the fourth variable represents spray rate. Furthermore, the touch sensing device 30 such as a capacitive sensing device supporting floating touch sensing is particularly applicable to buttons of medical/public equipments. Thus, the possibility of contact transmission and hospital-acquired infection (HAI) can be significantly reduced.

Through the description of these embodiments, it is realized that the shape of the substrate (sometimes viewed as a casing) of the touch sensing device can be arbitrarily designed for different applications, and it is not necessary to additionally provide a flat touch area for receiving the touch operation. Therefore, the design and application of the touch sensing device according to the present disclosure is much flexible.

Figure 4:
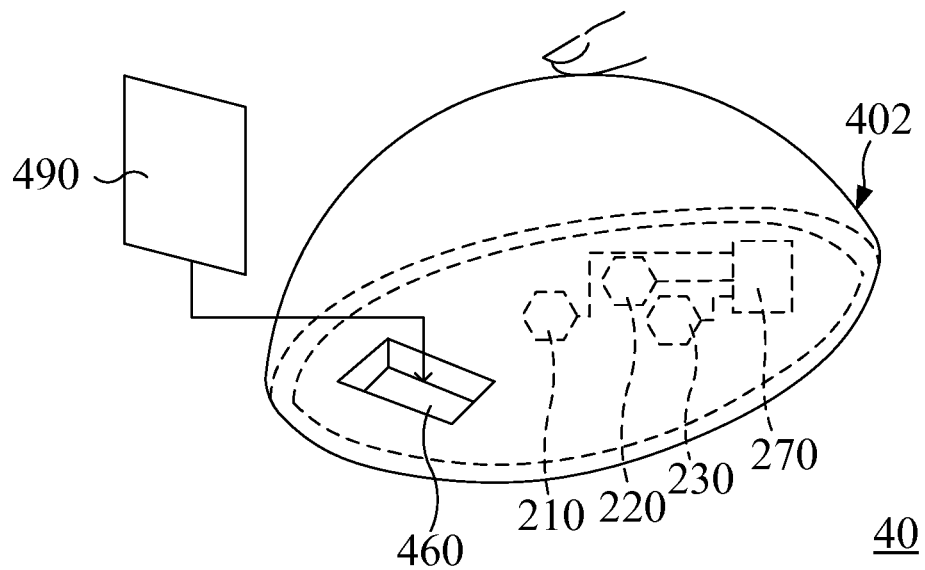
FIG. 4 is a perspective view illustrating a touch sensing device according to a further embodiment of the present invention.

Please refer to FIG. 4, a perspective view illustrating a touch sensing device according to a further embodiment of the present invention. A slot 460 is provided on the first surface 402 for holding or accommodating the controlled device 490. In an embodiment, the slot 460 can only hold the controlled device 490 without interfacing function. In another embodiment, the slot 460 is a connection port communicating the controlled device 490 with the processing unit 270 or a socket providing electricity to the controlled device 490. For example, the touch control system includes a smart phone (controlled device 490) and a charging stand (touch sensing device 40). The slot 460 is a universal serial bus (USB) port which can not only charge the smart phone but also communicate the smart phone with the processing unit 270 of the charging stand. The user can operate the smart phone by touch operation on the charging stand which issues control signals to the smart phone via the USB port. Another example is that the touch control system includes a television (controlled device 490) and a TV base (touch sensing device 40). A further example is that the touch control system includes an electronic robotic toy (controlled device 490) and an exhibit base (touch sensing device 40) wherein wireless communication is established therebetween.

Figure 5A:
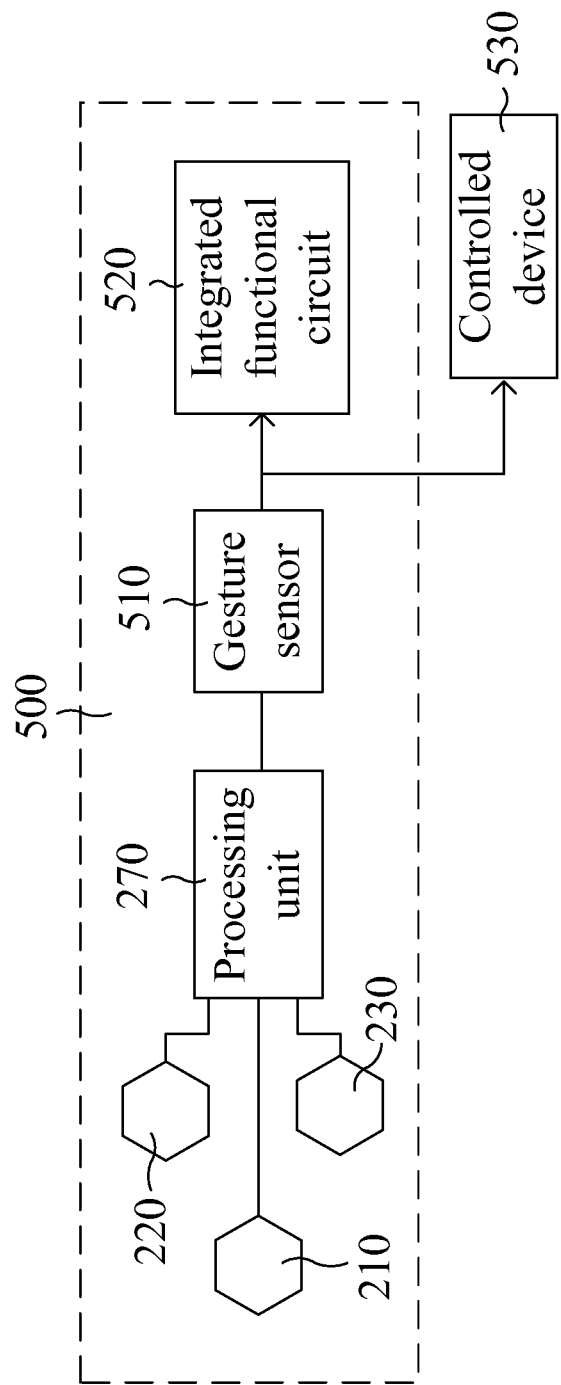
FIG. 5A and FIG. 5B are circuit block diagrams of touch control systems according to further embodiments of the present invention.

In addition to the conductive sensor pad units 210, 220, 230 and the processing unit 270, other functional circuits are optionally provided to meet requirements of the touch control system. Other than determination of the variables according to the sensing signals, the processing unit 270 may cooperate with a gesture sensor. Please refer to FIG. 5A, a circuit block diagram of a touch control system. The internal circuit 500 of the touch sensing device includes the conductive sensor units 210, 220, 230, the processing unit 270, a gesture sensor 510 and an integrated functional circuit 520. The gesture sensor 510 generates control signals to control the integrated functional circuit 520 or the controlled device 530 according to the values of the variables determined by the processing device 270, e.g. positions of the touch points or user gesture.

The controlled device 530 may be a portable device, e.g. MP3 player, smart phone, tablet computer, display and smart phone. The integrated functional circuit 520 may be a circuit module with functions of speaker, radio, clock, timer, mouse, projection keyboard, light source, global positioning system or a combination thereof. For example, the radio can switch channels automatically according to position information from the global positioning system when the touch control system passes across a border of two radio broadcasting areas. For examples, radio station A uses channel FM 103.3 at a first area and uses channel FM 102.9 at a second area. The integrated functional circuit 520 can determine the position of the touch control system in real-time according to the position information from the global positioning system to automatically switch the radio to proper channel. The integrated functional circuit 520 can further search the local popular radio station or the optimal channel.

The internal circuit 500 is in communication with the controlled device 530 through wire/wireless transmission. For example, a USB 1.0 port, a USB 2.0 port, a USB 3.0 port or other port complied with wire transmission is provided on the slot 460. Regarding wireless transmission, IR, Bluetooth, WiFi, RF, 2.4G, 5.8G or other wireless transmission protocol is used. In this condition, no interface except the charging socket is required on the slot 460.

Gesture of the user hand on the touch sensing device can control and operate the touch control device. For example, a sliding gesture in x-axis on the touch sensing device represents function switching to the speaker, the mouse, the projection keyboard, the light source and the global positioning system in a specified order. A tapping gesture represents selecting the current function. In a speaker mode or a lighting mode, a sliding gesture in y-axis represents volume up/down or illuminance adjustment. In a mouse mode, a keyboard mode or a global positioning system mode, the gesture sensor 510 of the internal circuit 500 sends the data involving coordinates and tracks of the touch object to the controlled device 530. If a display (not shown) is provided on the controlled device 530, a graphic user interface such as a virtual mouse or keyboard may be shown on the display to receive various inputs to achieve cursor control, page scrolling or GPS navigation using electronic maps. If the touch sensing device and the controlled device 530 support wireless transmission and wireless/inductive charging, the touch sensing device may have a seamless and waterproof casing and the slot 460 does not penetrate the casing. Thus, the touch sensing device can be applied to many strict conditions without damaging the internal circuit 500.

Figure 5B:
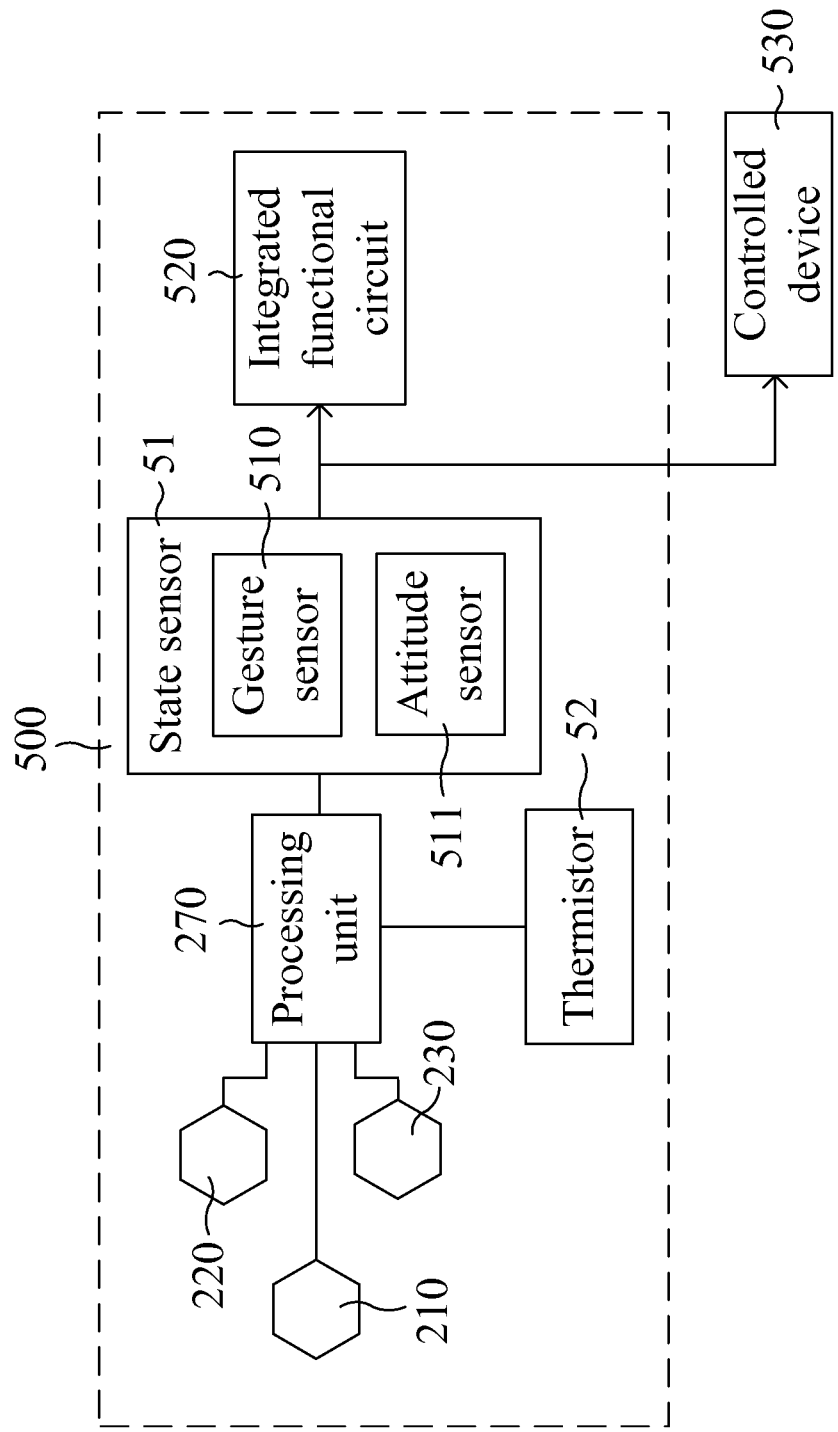

In FIG. 5B, the gesture sensor 510 is integrated with an attitude sensor 511 to provide a state sensor 51. Thus, the touch sensing device becomes a multipurpose device. For example, the multipurpose device functions as an earphone in a first state and functions as a speaker in a second state. The state sensor 51 determines the control signal according to the values of the variables and the state of the touch sensing device. When the touch sensing device is placed on a table, the attitude sensor 511 such as a g-sensor (accelerometer) senses that the touch sensing device is in the first state and determines the control signal (corresponding to a speaker) for the integrated circuit function 520. The integrated functional circuit 520 determines that the touch sensing device should function as a speaker and controls the output volume in a first volume range. When the user takes the touch sensing device from the table and wears it, the g-sensor senses that the touch sensing device is in the second state and determines the control signal (corresponding to an earphone) for the integrated functional circuit 520. The integrated functional circuit 520 determines that the touch sensing device should function as an earphone and controls the output volume in a second volume range wherein the second volume range covers a lower portion of the first volume range. Accordingly, the function of the touch sensing device is automatically switched in response to state change which can be sensed by the state sensor 51. The attitude sensor 511 is not limited to the g-sensor and other proper attitude sensor, e.g. gyroscope is applicable. In addition to switching volume range, the integrated functional circuit 520 can change directivity, sound field, timbre (tone quality) or treble and bass control to adjust setting for different states. The user can fine-tune the volume or tone quality by gestures sensed by the gesture sensor 510 which determines the control signal sent to the integrated functional circuit 520. The same concept can be applied to a toy with light and sound effect or a musical instrument. The timbre, volume and pitch of the toy or the musical instrument are controlled according to the sensing result of the attitude sensor 511 and the gesture sensor 510. The control signal can be further sent to the controlled device 530 to control the controlled device 530.

The present disclosure may be applied to smart wristband. In addition to the g-sensor, a thermistor 52 is further disposed in the touch sensing device. The thermistor 52 is in communication with the processing unit 270. The smart wristband has a human-machine interface provided by the touch sensing device of the present disclosure. Moreover, the control signal(s) for the integrated functional circuit 520 is determined according to an acceleration change in response to a motion state sensed by the g-sensor and a resistance change according to a temperature (change) sensed by the thermistor 52. The processing unit 270 can issue temperature information according to the resistance change of the thermistor 52 to the integrated functional circuit 520 or the controlled device 530. By using the touch sensing device, the smart wristband with function of temperature measurement, calories calculation and data input has simplified structure and low production cost.

Figure 6:
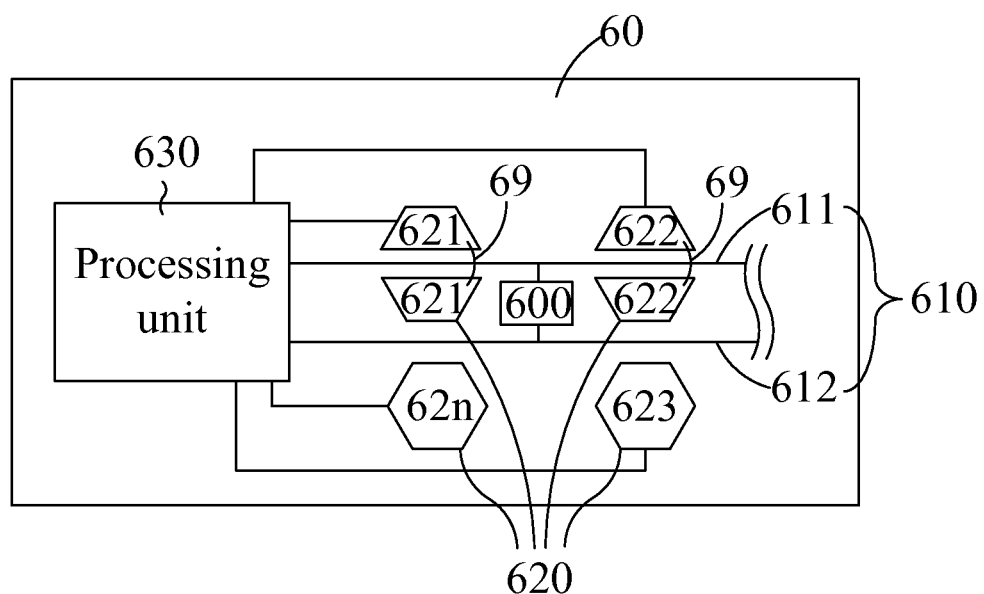
FIG. 6 is a schematic diagram illustrating an internal circuit implemented by a single layer single-sided circuit board.

The internal circuit 500 can be implemented by a single-layer single-sided circuit board with low cost and simplified manufacturing process. Referring to FIG. 6, a first conductive structure 610 and a second conductive structure 620 are formed on the same surface of a substrate 60. An integrated functional circuit 600 is electrically connected to power supplies via the first conductive structure 610. The integrated functional circuit 600 includes the functional circuits as mentioned above.

In an embodiment, the integrated functional circuit 600 is a light-emitting diode (LED) circuit, but is not limited to this. The first conductive structure 610 includes a first power lead wire 611 and a second power lead wire 612. The light-emitting diode circuit uses electricity supplied via the power lead wires 611 and 612 to emit light. According to the concept, three light-emitting diode circuits each of which is connected to a respective first power lead wire 611 and a common ground wire (second power lead wire 612) form a light-emitting diode light source with three primary colors.

The second conductive structure 620 includes separate conductive sensor pads 621, 622, 623 . . . 62n. These conductive sensor pads form the conductive sensor pad units 210, 220 and 230 as described with reference to FIG. 4. The conductive sensor pads 621, 622, 623 . . . 62n are isolated from the first power lead wire 611 and the second power lead wire 612. The conductive sensor pads (e.g. 621 and 622) may be divided into more than one part to prevent being in electrical contact with the first power lead wire 611 and the second power lead wire 612. The divided parts of the conductive sensor pads are electrically connected to each other via wires 69. The wires 69 and the integrated functional circuit 600 are formed in the same process. In an embodiment, the wires 69 and the integrated functional circuit 600 are mounted on the substrate 60 by surface mount technology (SMT). In another embodiment, the first power lead wire 611 and the second power lead wire 612 are designed to bypass the second conductive structure 620 without dividing the conductive sensor pads. If the internal circuit 500 is formed on a double-sided circuit board, the first power lead wire 611 and the second power lead wire 612 may go through the substrate 60 via a through hole (not shown) to achieve electrical connection on both surfaces of the substrate 60.

A processing unit 630 (and the gesture sensor) is connected to the power lead wires 611 and 612 and the conductive sensor pads 621, 622, 623 . . . 62n. The processing unit 630 receives, from the conductive sensor pads 621, 622, 623 . . . 62n, the sensing signals (e.g. capacitance changes) generated in response to the gestures or touch operations, and outputs a control signal to the integrated functional circuit 600 or a controlled device (now shown) according to the sensing signals (e.g. capacitance changes) to control or operate the integrated functional circuit 600 or the controlled device. The processing unit 630, the wires 69 and the integrated functional circuit 600 may be formed on the substrate 60 in the same process. Alternatively, the processing unit 630 is disposed outside the substrate 60 and electrically connected to the power lead wires 611, 612 and the conductive sensor pads 621, 622, 623 . . . 62n via a flexible flat cable (FFC).

Figure 7:
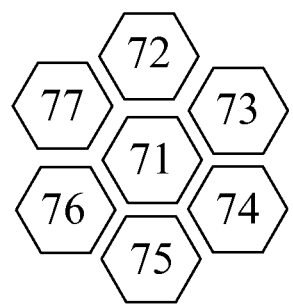
FIG. 7 is a schematic diagram illustrating layout of conductive sensor pads.

Please refer to FIG. 7, a schematic diagram illustrating layout of the conductive sensor pads. The conductive sensor pads 71, 72, 73, 74, 75, 76 and 77 are seven separate hexagonal sensor pads. For example, two adjacent conductive sensor pads construct one conductive sensor pad unit so that the seven sensor pads form twelve conductive sensor pad units (e.g. 77-76, 72-71, 73-74, 71-75, 77-72, 76-71, 75-74, 71-73, 72-73, 77-71, 76-75, 71-74). For a user gesture and touch operation, each conductive sensor pad unit has a capacitance sum. Twelve values are obtained according to differences between every two adjacent conductive sensor pad units (77-76 vs. 72-71, 72-71 vs. 73-74, 73-74 vs. 71-75, 71-75 vs. 77-76, 77-72 vs. 76-71, 76-71 vs. 75-74, 75-74 vs. 71-73, 71-73 vs. 77-72, 72-73 vs. 77-71, 77-71 vs. 76-75, 76-75 vs. 71-74, 71-74 vs. 72-73). The twelve values are classified into three data which are viewed as RGB data. In brief, the RGB data involving three variables are generated in response to user gesture or touch operation relative to the conductive sensor pads. With reference to FIG. 6, the processing unit 630 issues a control signal to the integrated functional circuit 600 (i.e. light-emitting diode circuit) through the first conductive structure 610 to control the color and luminous intensity. The touch points and touch track on the touch sensing device which are sensed by the conductive sensor pads 71, 72, 73, 74, 75, 76 and 77 can be used with a graphical user interface to perform instruction input, e.g. cursor control, page scrolling and movement in a 3D scene.

Figure 8:
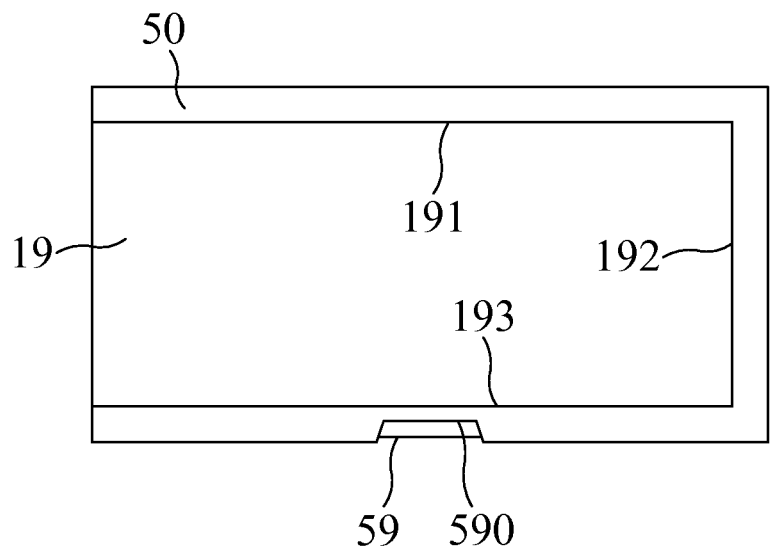
FIG. 8 is a schematic diagram illustrating a portion of a portable device using the touch sensing device according to the embodiments of the present invention.

If the touch sensing device takes advantage of flexible circuit board, the touch sensing device is suitable to be integrated into a casing of a portable device. As shown in FIG. 8, the conductive sensor pad units are arranged at a front area 191, a side area 192 and a back area 193 of the portable device 19 to sense user gestures or touch operations. Data generated by all of the conductive sensor pad units arranged at the front area 191, the side area 192 and the back area 193 may be processed by only one processing unit (not shown) to generate corresponding control signals. The processing unit may be implemented by an IC chip and disposed on the flexible circuit board 50. Alternatively, the touch sensing devices at the front area 191, the side area 192 and the back area 193 of the portable device 19 are implemented by separate circuit boards. Modification and variation can be made without limitation.

The conductive sensor pads at the front area 191 can sense common gesture or touch operation for smart phone or tablet computer, e.g. sliding with a thumb for page scrolling or tapping for icon selection. The conductive sensor pads at the side area 192 may replace conventional volume up/down button or zoom in/out button to save the relative cost. The conductive sensor pads at the back area 193 can sense forefinger movement to operate the portable device 19 such as page scrolling or cursor control on the display at the front area 191. The conductive sensor pads may be disposed on an inner surface of the back cover, embedded in the back cover by molding or formed on a battery (not shown) of the portable device 19. If there is any metal piece mounted on the back cover, an additional protective cover should be provided to cover the back area 193 or the back cover is formed by plastic clad on metal technology. The plastic portion may have a pattern of company logo and light effect is provided at the plastic portion. Compared to the prior arts, the present disclosure allows the user to operate the portable device with only one hand by moving his thumb and forefinger independently or simultaneously in a much convenient manner.

Since the user cannot see the back area 193 under normal operation, a groove 59 is provided as an initial position mark to be felt by the user. An image sensor module 590 may be disposed at the groove 59 to capture image of the finger touching the groove 59. Therefore, function of fingerprint recognition is further provided for the portable device 19.

Figure 9:
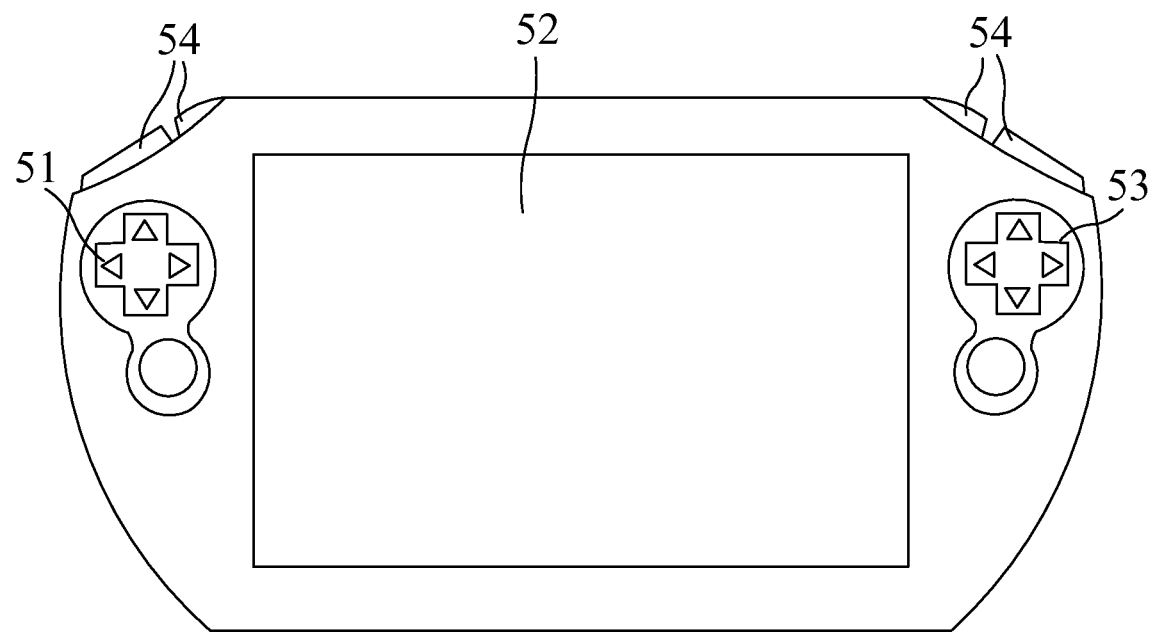
FIG. 9 is a top view illustrating a handheld game console using the touch sensing device according to the embodiments of the present invention.

The present disclosure can be applied to a handheld game console or a gaming pad. The handheld game console in FIG. 9 includes a left 5-way navigation key 51, a display 52, a right 5-way navigation key 53, lateral buttons 54 and a back cover (not shown). The left 5-way navigation key 51, the display 52, the right 5-way navigation key 53, the lateral buttons 54 and the back cover may be covered by the conductive sensor pad units of the present disclosure to achieve touch sensing purpose. The conductive sensor pad units and relative processing unit and/or the integrated functional circuit can be formed on a flexible single-layer single-sided circuit board. The concept of multi-directional touch sensing is applicable to other controllers or portable electronic devices.

The touch sensing device of the present disclosure supports floating touch operation. Namely, the touch sensing device can sense the touch object (e.g. finger) actually acting on the touch surface or floating over the touch surface. The floating touch operation involves a vertically moving action, a horizontally moving action or a holding-still action for a specified period of time. The vertically moving action (movement in z-axis, a normal to the touch surface) simulates a pressing operation on a virtual key. Several conductive sensor pads are combined to detect a capacitance change due to user finger, palm or conductive object so as to effectively enhance the sensitivity and effective sensible distance to achieve floating touch sensing. For example, by means of detecting capacitance change resulting from the floating touch operation, a combination of seven sensor pads would have a larger sensible distance than a combination of three sensor pads. The details of other grouping effects may refer to US 2014/0035865 A1, US 2014/0097857 A1 and US 2014/0097885 A1. Gradually increasing or decreasing the grouping size results in a scanning effect along the z-axis. Thus, the horizontal position of the touch object and the vertical distance between the touch surface and the touch object can be determined to enhance the intuitive operation. For example, after the user moves a cursor on the display to an icon, the user finger or palm can move toward the touch surface to simulate a pressing action so that the distance between the user finger or palm and the touch surface gradually decreases. The distance change is detected. The icon is controlled to deform, e.g. curving inward continuously, in response to the simulated pressing action. After the distance is smaller than a specified threshold, e.g. 50% of the initial distance, the icon shows a breaking effect and function represented by the icon is actuated.

Since the present disclosure supports floating touch sensing, it is not required to mount the internal circuit on a casing having an outer surface for receiving the touch operation. In other words, air gap may exist between the internal circuit (including the processing unit) and an inner surface of the casing so as to increase design flexibility. The touch sensing device may be fixed to the controlled device or coupled to the controlled device in a pluggable manner. It is to be noted that the slot for holding the controlled device is not necessary for the touch sensing device. The touch sensing device can operate independently and function with its own circuit module with functions of gesture sensor, speaker, radio, clock, timer, mouse, projection keyboard, light source, global positioning system or a combination thereof.

In conclusion, the touch sensing device and touch control system can determine values of a plurality of variables to significantly lift use restriction about touch control. Thus, it is predicted that the present disclosure will have a variety of applications in touch sensing field.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A touch sensing device comprising:
a substrate having a first surface and a second surface opposite to the first surface;
a first conductive sensor pad unit, disposed on the second surface or positioned near the second surface, configured to sense a touch operation relative to the first surface and generate a first sensing signal in response to the touch operation;
a second conductive sensor pad unit, disposed on the second surface or positioned near the second surface, configured to sense the touch operation relative to the first surface and generate a second sensing signal in response to the touch operation;
a third conductive sensor pad unit, disposed on the second surface or positioned near the second surface, configured to sense the touch operation relative to the first surface and generate a third sensing signal in response to the touch operation; and
a processing unit, in communication with the first conductive sensor pad unit, the second conductive sensor pad unit and the third conductive sensor pad unit, configured to receive the first sensing signal, the second sensing signal and the third sensing signal, determine values of at least a first variable, a second variable and a third variable according to the first sensing signal, the second sensing signal and the third sensing signal, and determine a value of a fourth variable regarding z-axis information of the touch operation according to a sum of the first sensing signal, the second sensing signal and the third sensing signal.

2. The touch sensing device according to claim 1, wherein the processing unit determines the value of the first variable according to a difference between the first sensing signal and the second sensing signal, determines the value of the second variable according to a difference between the first sensing signal and the third sensing signal, and determines the value of the third variable according to a difference between the second sensing signal and the third sensing signal.

3. The touch sensing device according to claim 1, wherein the substrate is a curved substrate, one of the first surface and the second surface is a convex surface, and the other one of the first surface and the second surface is a concave surface.

4. The touch sensing device according to claim 1, wherein the processing unit determines the value of the first variable according to a difference between a change of the first sensing signal at two time points and a change of the second sensing signal at the two time points, determines the value of the second variable according to a difference between the change of the first sensing signal and a change of the third sensing signal at the two time points, and determines the value of the third variable according to a difference between the change of the second sensing signal and the change of the third sensing signal.

5. The touch sensing device according to claim 1, further comprising an attitude sensor in communication with the processing unit, configured to sense a state of the touch sensing device and determine a control signal according to the state of the touch sensing device, the attitude sensor being a g-sensor or a gyroscope.

6. The touch sensing device according to claim 1, further comprising a thermistor in communication with the processing unit, the thermistor having a resistance change according to a temperature, the processing unit issuing temperature information according to the resistance change of the thermistor.

7. A touch control system comprising:
a touch sensing device comprising:
a substrate having a first surface and a second surface opposite to the first surface;
a first conductive sensor pad unit, disposed on the second surface or positioned near the second surface, configured to sense a touch operation relative to the first surface and generate a first sensing signal in response to the touch operation;
a second conductive sensor pad unit, disposed on the second surface or positioned near the second surface, configured to sense the touch operation relative to the first surface and generate a second sensing signal in response to the touch operation;
a third conductive sensor pad unit, disposed on the second surface or positioned near the second surface, configured to sense the touch operation relative to the first surface and generate a third sensing signal in response to the touch operation; and
a processing unit, in communication with the first conductive sensor pad unit, the second conductive sensor pad unit and the third conductive sensor pad unit, configured to receive the first sensing signal, the second sensing signal and the third sensing signal, determine values of at least a first variable, a second variable and a third variable according to the first sensing signal, the second sensing signal and the third sensing signal, and determine a value of a fourth variable regarding z-axis information of the touch operation according to a sum of the first sensing signal, the second sensing signal and the third sensing signal; and
a controlled device, in communication with the processing unit, configured to receive the values of the first variable, the second variable and the third variable from the processing unit, the controlled device being controlled according to the values of the first variable, the second variable and the third variable.

8. The touch control system according to claim 7, wherein the substrate is a curved substrate, one of the first surface and the second surface is a convex surface, and the other one of the first surface and the second surface is a concave surface.

9. The touch control system according to claim 8, wherein a slot is provided on the first surface for holding the controlled device.

10. The touch control system according to claim 7, wherein the processing unit determines the value of the first variable according to a difference between a change of the first sensing signal at two time points and a change of the second sensing signal at the two time points, determines the value of the second variable according to a difference between the change of the first sensing signal and a change of the third sensing signal at the two time points, and determines the value of the third variable according to a difference between the change of the second sensing signal and the change of the third sensing signal.

11. The touch control system according to claim 7, wherein the processing unit determines the value of the first variable according to a difference between the first sensing signal and the second sensing signal, determines the value of the second variable according to a difference between the first sensing signal and the third sensing signal, and determines the value of the third variable according to a difference between the second sensing signal and the third sensing signal.

12. The touch control system according to claim 7, further comprising an attitude sensor in communication with the processing unit, configured to sense a state of the touch sensing device and determine a control signal according to the state of the touch sensing device, the attitude sensor being a g-sensor or a gyroscope.

13. The touch control system according to claim 7, further comprising a thermistor in communication with the processing unit, the thermistor having a resistance change according to a temperature, the processing unit issuing temperature information according to the resistance change of the thermistor.

\* \* \* \* \*